United States Patent

[11] 3,564,347

[72] Inventors David B. Peck;
Walter W. Schroeder, Williamstown, Mass.
[21] Appl. No. 792,648
[22] Filed Jan. 21, 1969
[45] Patented Feb. 16, 1971
[73] Assignee Sprague Electric Company
North Adams, Mass.

[54] ELECTROCHEMICAL TIMER
11 Claims, 2 Drawing Figs.
[52] U.S. Cl. .................................................... 317/230,
29/570
[51] Int. Cl. .................................................. H01g 9/06
[50] Field of Search ........................................... 317/230,
231, 232, 233

[56] References Cited
UNITED STATES PATENTS
2,791,473 5/1957 Mattox ......................... 317/231X
3,119,754 1/1964 Blumenfeld .................. 317/231X
3,210,662 10/1965 Steinmetz et al. ............ 317/231X
3,423,648 1/1969 Mintz ........................... 317/231
3,512,049 5/1970 Hoberman et al. ........... 317/231
FOREIGN PATENTS
1,026,801 4/1966 Great Britain ................ 317/230

Primary Examiner—James D. Kallan
Attorneys—Connolly and Hutz, Vincent H. Sweeney, James Paul O'Sullivan and David R. Thornton ABSTRACT: An electrochemical timer has a metal cathode electrode in the form of a container housing an electrolyte, an anode electrode and an elongated nonconducting anode support means having extremities larger than the region between the extremities. The intermediate region of the support means carries the anode of the device and the extremities of the support means serve to space the anode from the cathode.

PATENTED FEB 16 1971

3,564,347

ELECTROCHEMICAL TIMER

BACKGROUND OF THE INVENTION

The present invention relates to electrochemical devices and more particularly refers to timing devices using the well-known coulometric principle.

Electricity has been traditionally measured, in terms of quantity, by the expression coulomb, a practical unit, referring to the passage of one ampere of current for one second. Thus, the unit coulomb is a measurement relating the product or electrical current and time.

In the electroplating industry the coulomb again finds use as a standard reference unit. For example, to plate silver, approximately 0.9 coulombs of energy are required to deposit 1 milligram of silver in a plating cell. Conversely, approximately 1.12 milligrams of silver will be plated, assuming appropriate electrode conditions, electrolyte, etc., through the passage of one coulomb. The same time-energy relationship can apply to deplating silver.

This principle can be employed to measure time, based upon a known amount of metal to be plated or deplated plus a known amount of current. One practical embodiment of such a time measurement cell would consist of two dissimilar metals separated by an electrolyte with one of these metal electrodes being plated with a layer of the metal of the other electrode. If electrical current is passed through the cell in the appropriate direction, the plated layer will dissolve in the electrolyte as a function of the amount of current flowing, until finally it is completely removed from the base electrode. At this time, the electrolytic cell will consist of two dissimilar electrodes and, in accordance with electrochemical principles, a voltage will appear across the two electrodes. This change, from essentially no voltage during the deplating to the appearance of a voltage at the completion of deplating, can be used to signal the end of a time period, the duration of which reflects the number of coulombs passed, which in turn reflect the number of coulombs used to plate the coating.

Unfortunately, however, the reliability and uniformity of such coulometric timing cells has been handicapped by several deficiencies. In one instance, it has been customary to use a system of gold vs. silver, both being highly stable precious and/or noble metals. But because of the cost of the gold, and sometimes the silver, the material has been plated on a metal carrier or support, such as iron. Such systems have the defect that if any imperfection in the gold plating exists, and the underlying base support electrode becomes exposed to the electrolyte, destructive corrosion will occur, even in the absence of externally applied current.

A practical example of such a system consists of a silver cathode electrode in the form of a container, a phosphoric acid electrolyte, and a gold electrode plated onto a thin nickel layer which is in turn plated onto an inexpensive iron substrate or core. It is extremely difficult to obtain a flawless or pore-free nickel plate on the iron cores, and, since gold will plate better on the nickel, defects in the latter plate will cause chemical deterioration and/or deposition and/or corrosion even in the absence of external current, especially at these defect sites. These defect sites probably are caused by iron oxide and the metals involved will not plate on iron oxide.

Other problems exist in prior art coulometric devices. One of these, for example, is the difficulty in obtaining uniform low resistance electrolyte contact to all the electrode surfaces active in the operation of the cell. Thus, in the case of a nickel-nickel plated gold coulometric cell, if a position sensitive bubble appears in the electrolyte, certain of the plated gold surface may not be deplated, and this will cause an inaccurate (low) end of time reading. According to the present invention these and other defects of prior art devices have been overcome by novel chemical and/or structural features.

An object of this invention is to present a stable coulometric cell which will withstand high vibration and shock over a wide environmental temperature range.

A further object is to produce a reversible and/or rechargeable coulometric cell.

Yet another object is to present a variable timing device employing coulometric principles.

Still another object of this invention is to present an electrochemical timer of exceptional accuracy.

Additional objects will become apparent from the following description and claims.

SUMMARY OF THE INVENTION

The coulometric cell of the present invention comprises a metal cathode electrode in the form of a container, an electrolyte, an anodic electrode and an elongated, nonconducting anode support means having extremities larger than the region between extremities. The anode is either (1) of the same metal as the cathode or (2) a conductive material which is more cathodic than the cathode metal and carrying a plating of the same metal as said cathode. The intermediate region of the support means is designed and constructed so as to expose the maximum possible anode surface to the electrolyte. The extremities of said support means serve to accurately space the anode from the cathode and also to provide mechanical stability under severe environmental conditions. In a more limited and preferred embodiment of the invention the cathode element is a metal selected from the group consisting of zinc, cadmium, cobalt, silver, nickel, tin and lead. The anode electrode is a conductive material selected from the group consisting of carbon, boron carbide, copper, silver, rhodium, palladium, platinum, and gold, said anode being plated with a layer of the metal of the cathode container. The electrolyte of the cell, which is interposed between the cathode and the anode, is preferred to be an electrolyte which will dissolve ions of the cathode container without dissolving the atomic metal of the anode.

In another preferred embodiment the anode may be either a metal plating carried by the intermediate shaft of the support means or a metal wire wrapped about the intermediate shaft of the support means. It is preferred that when the anode is a metal wire, that the wire be a member of the group consisting of silver and gold, each carrying a plating of silver, and it is preferred that the cathode be silver.

DETAILED DESCRIPTION OF THE INVENTION

Figure 1:
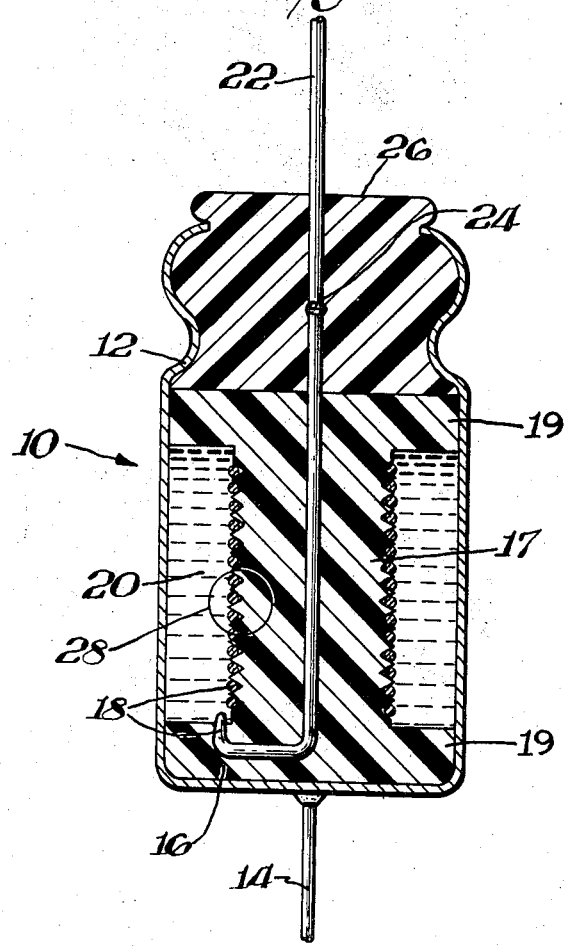
FIG. 1 of the drawing is a side view in section of an electrochemical timer of the present invention.
Figure 2:
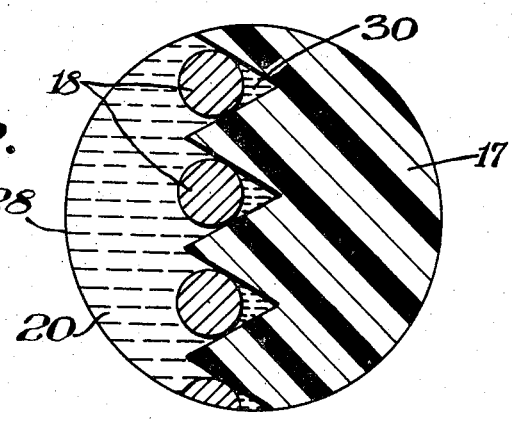
FIG. 2 is an enlarged view of region 28 of FIG. 1.

In the drawing, an electrochemical timer 10 has a metal cathode can 12. The cathode can has a metal cathode lead 14 affixed thereto. Located within can 12 is an insulating bobbin 16 having a threaded central shaft 17. Located down through the center of bobbin 16 and helically wound onto threaded central shaft 17 of said bobbin is anode wire 18 which is plated with the same metal of cathode can 12. Placed in contact with the anode and the cathode is electrolyte 20. Bobbin 16 is provided with end shoulders 19 which fit against the inside surface of cathode container 12. A metal anode lead 22 is in contact with anode wire 18 at point 24. Located about the juncture of anode lead 22 and anode wire 18, and closing can 12, is a resilient sealing bung 26 which is held in place by an inspinning or crimping of the cathode can. That part of anode wire 18 in the center of bobbin 16 is not exposed to the electrolyte, and, thus, is not part of the active anode of the timer. Region 28 of FIG. 1 is shown enlarged in FIG. 2. FIG. 2 illustrates that electrolyte 20 is available in the trough 30 of the threaded central shaft 17.

EXAMPLE I

An insulating bobbin having the general configuration shown in the drawing is prepared. This unit is preferably a molded thermoplastic unitary member having the following dimensions. The central shaft is approximately 0.113 inch in diameter, the central region is threaded so as to have approximately 52 threads per inch, said threads being approximately 0.004 inch deep. A central bore extends through the longitudinal axis of the intermediate member and its enlarged ends. This bore should be at least large enough to accommodate the anode wire of the subject device. The length of the intermediate region is approximately 0.250 inch long or a sufficient length to provide approximately 5 inches of anode wire wound thereon. The enlarged ends of the bobbin can be approximately 0.195 inch in diameter and approximately 0.060 inch thick. At one end of the insulating bobbin, a slot is provided so as to accommodate the anode wire which will pass down through the central bore and then be wound upon the threaded portion of the intermediate region of the bobbin.

A length of solid gold wire is threaded through the central bore and pulled back onto the threaded portion of the bobbin. The wire follows the thread and approximately 5.3 inches of wire is wound onto the intermediate region of the bobbin. The wire bobbin is then inserted into a standard silver plating bath of the following composition: AgCN 50g/1, KCN 100g/1, $K_2CO_3$ 35g/1, $KNO_3$ 100g/1. A specific mass of silver is plated onto the gold wire equivalent to approximately 500 microampere hours. This assembly is inserted into a clean silver cathode can having a cathode lead attached thereto and a quantity of a working electrolyte is added to the unit. The electrolyte should contact all of the silver plate on the anode wire. The working electrolyte is a 60 weight percent phosphoric acid solution containing 0.9N Ag+ obtained from $Ag_3PO_4$. A nickel lead wire is butt-welded to the silver plated gold wire and the unit is sealed in a conventional manner using a Kel F bung by inspinning the can against the bung.

The unit was tested and at the end of 500 microampere hours of discharge, a significant increase in voltage signalled the complete deplating of the silver anode.

EXAMPLE II

A unit identical to the above-described unit is formed but instead of employing a gold wire, a silver wire approximately 3 mils in diameter is employed. The amount of silver represented by this wire constituted about 100 microampere hours capacity. The wire after being mounted on the insulating bobbin is plated with an equivalent of 400 microampere hours of silver in the same manner and using the same plating electrolyte as in the preceding example. The completed unit is tested and at the end of 500 microampere hours of discharge a significant rise in voltage will indicate an effective open circuit. This open circuit provides a far more positive signal than when a silver plated gold wire is employed.

As another specific example, the cathode container can be zinc while the anode wire can be copper wire having a plating thereon of zinc.

While good results have been obtained when the anode element is plated with the cathode metal prior to assembly into the cell and exposure to the electrolyte, it is to be understood that the plating of the anode wire can be effected within the cell itself using an appropriate electrolyte system.

In another specific embodiment the anode will consist of a metal plated upon an insulating substrate such as the bobbin shown in the drawing herein. In the case of gold, the gold would be applied to the insulating substrate by "electroless" plating followed by the application of more gold by conventional electroplating. For final preparation for use in the coulometric cell the gold would be plated with silver when the cathode is to be silver.

In another limited embodiment of the present invention, an anode element produced as described immediately above, would have a helical shape and be threaded through an insulated spacer such as to expose varying amounts of plated surface to the electrolyte. By adjusting the surface area exposed, adjustment in the coulometric timing may be achieved.

The selection of an electrolyte system is dependent upon the metals employed in the coulometric cell. These electrolytes may be acidic, alkaline or neutral in nature depending upon the system, but they must have a tolerance for the ions of the plated layer on the anode. For example, phosphoric acid electrolytes are suitable for silver plated anodes on a gold substrate. The electrolyte may be gelled through the use of an organic or inorganic additive, although caution must be exercised to assure ion mobility.

Coulometric cells with a self-destructive feature can be also produced by appropriate selection of electrodes and electrolytes, plus appropriate peripheral circuitry. For example, a system may be designed to generate substantial amounts of gas upon completing of the deplating process. This gas can build up sufficient pressure to rupture the seal and destroy the structure and/or adjacent components.

It is to be understood that the particular details of the foregoing examples are merely by way of illustration and are not intended to be limitative of the present invention. For example, the bobbin need not have the precise physical dimensions of the foregoing examples. It is sufficient if the bobbin is generally an elongated insulating member that has extremities larger than the region between extremities, the intermediate region being designed to carry the anode of the unit. The insulating bobbin can be made of either organic or inorganic material, any suitable organic polymer, ceramic or other inorganic material can be employed in the preparation thereof.

When a wire anode is employed, it is preferred that the intermediate portion of the bobbin be threaded so as to insure uniform spacing of the anode material and as an aid in roughly measuring the length of the anode wire employed. As illustrated by FIG. 2, the use of a threaded intermediate region also assures that the maximum possible surface area of anode is exposed to the electrolyte of the coulometric cell. This increases the accuracy of the unit.

The anode metal may be plated on the intermediate region of the insulating bobbin in any manner known to the prior art. For example, a carbon base could be applied to the surface of the insulating bobbin and thereafter gold followed by silver plating of gold may be performed.

While theoretically any liquid current carrier can be employed as the working electrolyte, specific electrolytes which may be employed are sulfuric acid, silver cyanide, etc. The electrolyte must contain a sufficient amount of the ion of the deplatable metal in order to eliminate gas evolution at the cathode. The electrolyte is not limited to inorganic solutions since organic electrolytes which will dissolve salts of the deplatable anode metal can also be used.

Since it is obvious that many changes and modifications can be made in the above described details without departing from the nature and spirit of the invention, it is to be understood that the invention is not limited to said details except as set forth in the appended claims.

We claim:

1. A coulometric cell comprising a metal cathode electrode in the form of a container, an electrolyte in said container, a nonconductive anode support means in said electrolyte, said support means being an elongated member having an extremity in engagement with the wall of said container for positively positioning said member in said container, said support having a surface extending in substantial parallelism with a portion of the wall of said container; an anode carried by said support means, said anode having an active portion in contact with said electrolyte and disposed on said support surface and in substantially constant spaced relationship with said portion of the wall; said anode being a member selected from the group consisting of:
   1. the same metal as said cathode;
   2. a conductive material more cathodic than the cathode metal; and
   3. a conductive material more cathodic than the cathode metal and also carrying a plating of the same metal as said cathode.

2. The cell of claim 1 wherein said same metal as said cathode is a metal of the group consisting of zinc, cadmium, silver, tin and lead; and said conductive material more cathodic than the cathode, is of a member of the group consisting of carbon, boron carbide, copper, silver, rhodium, palladium, platinum and gold.

3. The cell of claim 2 wherein said anode is in the form of either a wire or a thin film.

4. The cell of claim 1 wherein said anode is in the form of either a wire or a thin film.

5. The cell of claim 4 wherein said nonconductive anode support means is an elongated member having extremities larger than the region between extremities, said active anode portion being disposed on the region between said extremities and being spaced from said cathode by said extremities.

6. The cell of claim 5 wherein said anode is in the form of a thin film of a member of the group consisting of silver, gold and silver plated gold.

7. The cell of claim 6 wherein said cathode is silver.

8. The cell of claim 4 wherein said anode is in the form of a wire and wherein part of said wire extends beyond one end of said support means, part is sealed within the longitudinal axis of said support means and the remainder is wrapped about said support surface.

9. The cell of claim 4 wherein said support surface is threaded to uniformly space the turns of wire and afford maximum exposure of said anode to said electrolyte.

10. The cell of claim 9 wherein said anode is of a member of the group consisting of silver, gold and silver plated gold.

11. The cell of claim 10 wherein said cathode is silver.